Dec. 2, 1952 J. D. SUMNER ET AL 2,620,032
APPARATUS FOR AUTOMATICALLY CUTTING PREDETERMINED
LENGTHS OF TUBULAR OR RODLIKE MATERIAL
Filed Oct. 18, 1949 5 Sheets-Sheet 1

Inventors
James Douglas Sumner
George Henry Goulding
Ronald Ernest Golding
By Benj. T. Rauber
Attorney

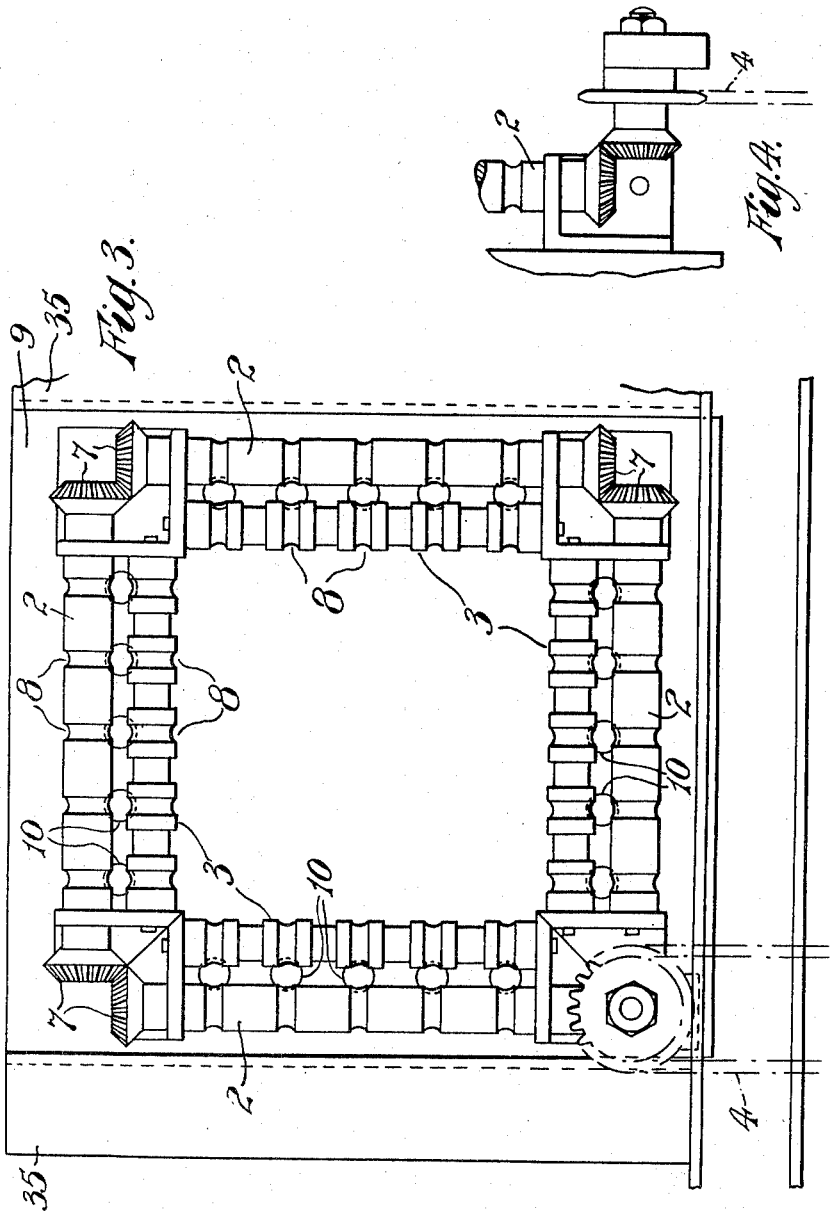

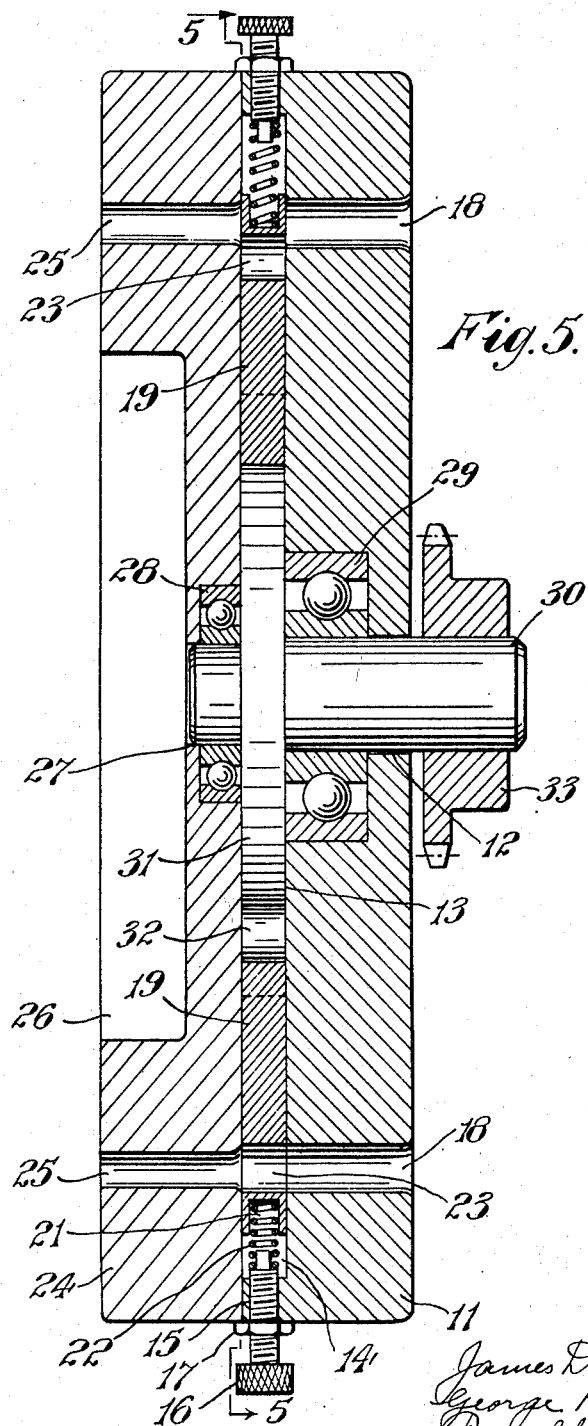

Patented Dec. 2, 1952

2,620,032

UNITED STATES PATENT OFFICE 2,620,032

APPARATUS FOR AUTOMATICALLY CUTTING PREDETERMINED LENGTHS OF TUBULAR OR RODLIKE MATERIAL

James Douglas Sumner, Woolton, Liverpool, George Henry Goulding, Birmingham, and Ronald Ernest Golding, Stechford, Birmingham, England, assignors to Dunlop Rubber Company Limited, London, England, a British company Application October 18, 1949, Serial No. 122,024
In Great Britain October 22, 1948

10 Claims. (Cl. 164—61)

This invention relates to an apparatus for automatically cutting pre-determined lengths of tubular or rod-like material transversely, for example, cutting rubber washers from rubber tubing.

In a known apparatus for automatically making rubber washers by cutting short lengths from rubber tubing, the ends of a plurality of longer lengths of rubber tubing are gravity fed through perpendicular metal tubes on to an adjustable surface plate. A knife revolving horizontally just below the ends of the metal tubes cuts the rubber tube to a length determined by the distance of the surface plate from the knife. The disadvantage of this apparatus, however, is that the rubber tubes, being only gravity fed, are liable to stick in the metal tubes, and in addition, the ends of the tubes may not have reached the surface plate before being cut off by the revolving knife, thus giving washers of varying thickness.

It is the object of this invention to provide an apparatus for automatically cutting tubular or rod-like material into sections of a uniform and predetermined length.

According to the present invention apparatus for cutting lengths of tubular or rod-like material transversely into portions of predetermined length comprises a guide member having a plurality of holes for guiding the said material, a cutting member adapted to traverse each of the said guide holes in turn, means for trapping the said material in the guide holes, means for releasing the said material in a guide hole prior to the passage of the cutting member, means for advancing the said material through the guide hole, and means for stopping each length of material in turn prior to the passage of the cutting member when it projects a predetermined length through the guide hole, whereby a portion of pre-determined length is cut from the said material.

Preferably the apparatus comprises a rotatable cutting member eccentrically mounted on a rotatable head, a stop mounted on said head, rollers for continuously feeding said material towards the stop, a feed plate adjacent said rollers to correctly space said material, a guide member between the feed plate and cutting member comprising front and back guide plates each having a plurality of guide holes therethrough, and spring loaded cam operated slides in the guide member to trap the material and to permit its ends to move individually and successively into contact with the stop, whereby said material may be cut transversely by the cutting member.

An embodiment of the invention will now be described with reference to the accompanying drawings wherein:

Figure 3 is an enlarged end view of part of the opposite end of the apparatus showing the feed rollers.

Figure 4 is an enlarged part elevation showing the drive for the feed rollers.

Figure 5 is an enlarged view of part of Figure 1 showing the guide plates.

Figure 1:
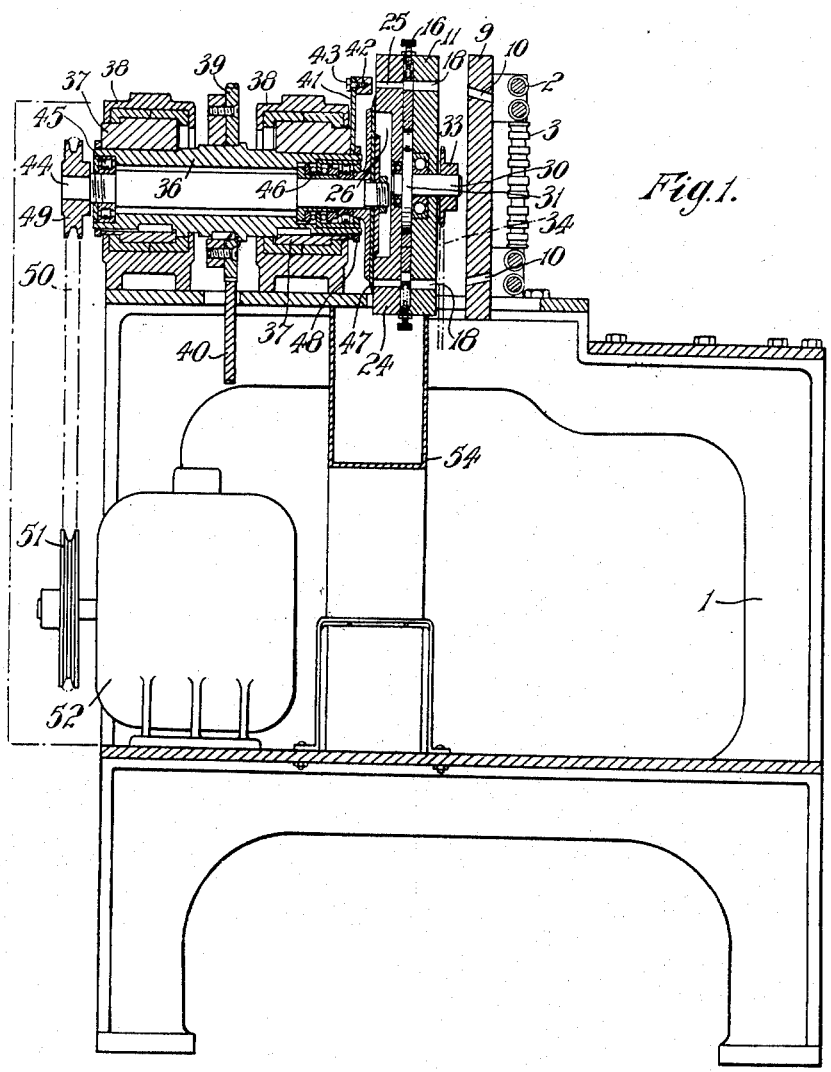
Figure 1 is a sectional elevation of the apparatus on the line 1—1 of Fig. 2.
Figure 2:
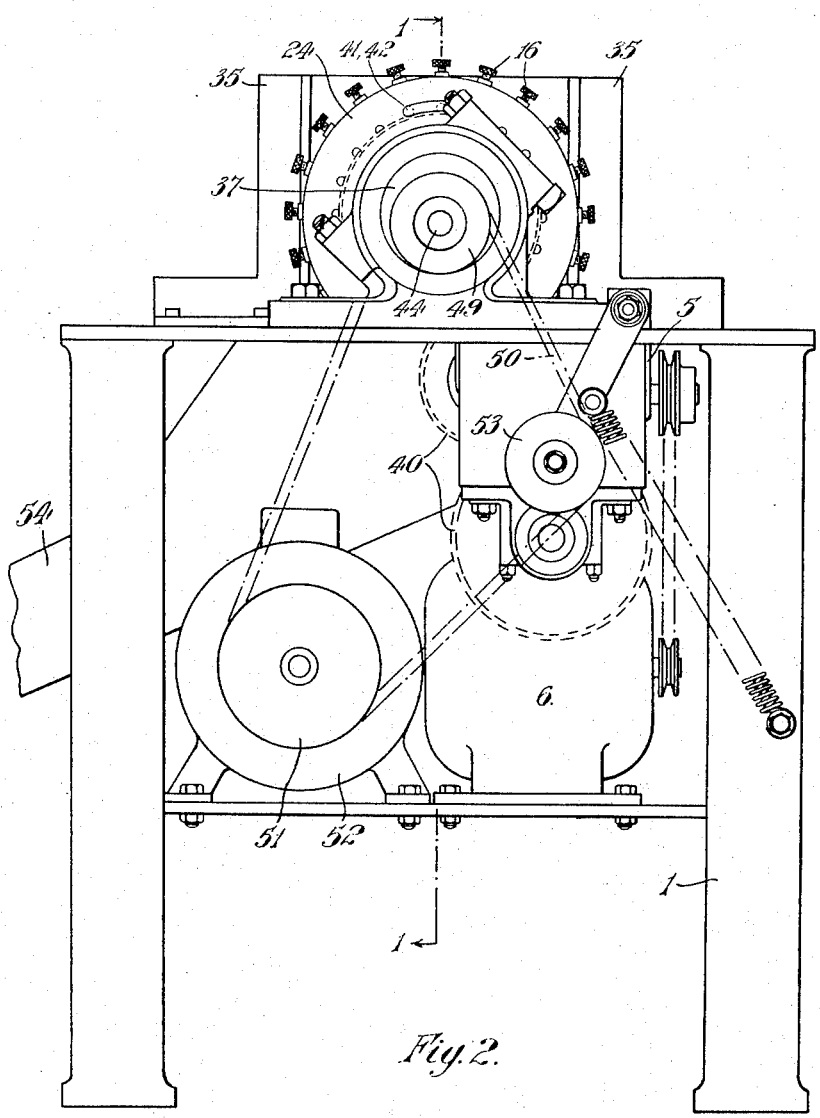
Figure 2 is an end view of the apparatus showing the driving arrangements.

The apparatus illustrated in the above drawings can accommodate twenty lengths of rubber tubing to be cut into thin washers.

The apparatus comprises a frame support 1 on which is carried the feeding, guiding, cutting and driving members.

The feeding means consists of four sets of rollers, each set comprising an outer roller 2 and five co-axial inner rollers 3 the total length of the inner rollers equalling the length of the outer roller and said rollers being arranged in parallel side by side relationship with the outer roller. Two sets are arranged vertically and two sets horizontally, each set being disposed at right angles to the ends of an adjacent set and forming a square. The outer roller of each set is driven, one outer roller being connected by means of a driving chain 4 to a reduction gear 5 which is driven by a motor 6, the drive being transmitted from one outer roller to another by gears 7 at the end of each roller. The inner rollers of each set are freely rotatable. Each outer roller is provided with five equispaced circumferential grooves 8 and each inner roll has one circumferential groove 8 located to coincide with one of the grooves on the outer roll, the grooves being of such depth that rubber tubing passing through them is gripped by the inner and outer rollers.

A feed plate 9 is positioned behind the sets of rollers and has twenty holes 10 drilled therethrough. Each hole is of slightly larger diameter than the rubber tubing and is drilled at an angle through the plate so that on the side of the plate adjacent the rollers the holes lie on the perimeter of a square and are in alignment with the grooves 8 on said rollers, and on the other side of the guide plate the holes lie on the perimeter of a circle.

Figure 6:
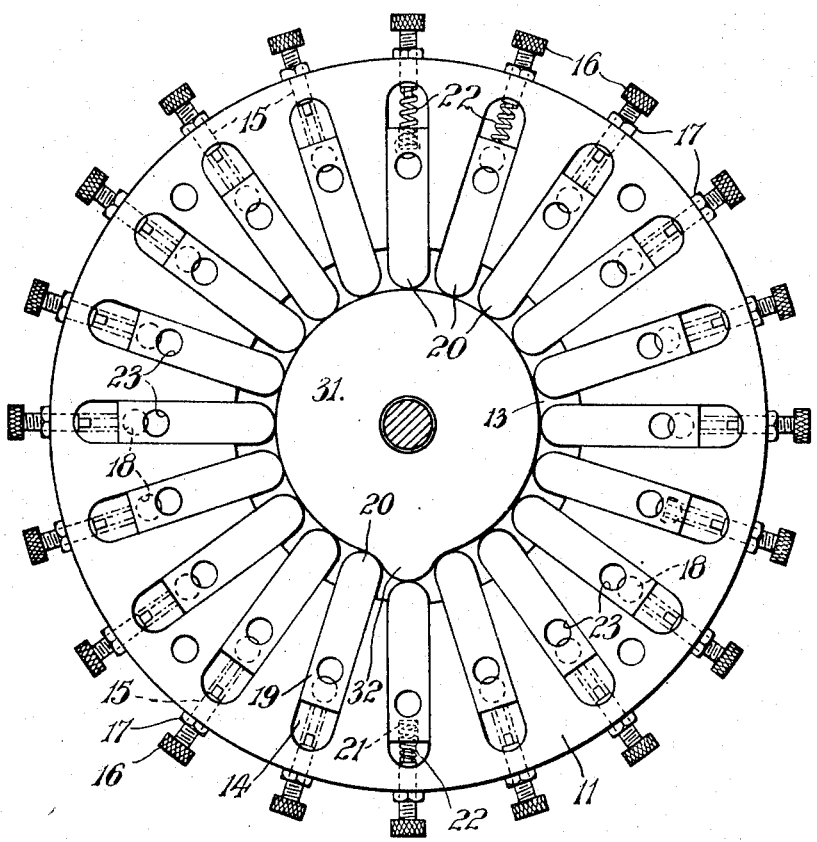
Figure 6 is a view of the back guide plate and slides on the line 5—5 of Figure 5.

Adjacent the feed plate 9 is a circular back guide plate 11 having a central axial hole 12, (Figs. 5 and 6). One face of the plate is stepped to provide a central recess 13 having a diameter of approximately half the diameter of the circular plate and a depth of approximately one quarter the thickness of said plate. Twenty equi-spaced radial slots 14 extend from this step to a point adjacent the outer periphery of the plate. A radial hole 15 is provided at the end of each slot, extending centrally from said end to the outer periphery of the plate, said hole being threaded and a screw 16 and lock nut 17 being provided. Twenty holes 18, each having a diameter slightly larger than the diameter of the rubber tubing, are drilled through the plate, each from a location centrally of the width of the slot and each on the same pitch circle.

A slide 19 is provided in each slot and has a rounded end 20 projecting below the step provided in one face of the circular plate. The end of each slide remote from its rounded end is provided with a blind hole 21 extending longitudinally of said slide, and one end of a coiled compression spring 22 is fitted into said blind hole, the other end of said spring being inserted into the threaded hole 15 of the circular plate, where it abuts the end of the screw 16. A hole 23 is drilled transversely through each slide and has a diameter slightly larger than the diameter of the rubber tubing.

Each slide is adjustable by means of the compression spring and its associated screw, so that the transverse hole in each slide is axially offset inwardly from the corresponding hole 18 in the circular plate. Thus the centres of the holes in the slides are disposed about a circle of less diameter than that of the corresponding holes in the circular plate, but are radially in line with said corresponding holes. When the hole 23 is aligned with the passages 18 and 25 the material passes freely but is caught when the slide 19 is moved by its spring 22 to bring the hole 23 out of alignment with the passages 18 and 25, the slide acting as releasable catch.

Bolted to the back guide plate is a front guide plate 24, comprising a circular plate of the same diameter as the back guide plate and provided with twenty holes 25 of the same diameter as the rubber tubing, said holes being co-axial with the holes provided in the back guide plate, and in line radially, but out of line axially with the corresponding holes in the slides. The front guide plate is secured to the recessed face of the back guide plate, the recess forming a chamber between said two plates. The front guide plate also has a recessed portion 26 centrally of its face remote from the back guide plate, for a purpose to be later described.

The guide plates are bolted to brackets 35 which are secured to the support frame 1.

The front guide plate has a central hole 27 co-axial with the hole 12 in the back guide plate, said holes being recessed to house ball bearings 28 and 29 which support a shaft 30 carrying a cam 31 located in the chamber between the two guide plates. Said cam comprises a disc having a circular radial projection 32 which is adapted to successively strike the projecting end 20 of each slide 19. The cam shaft is driven by means of a sprocket wheel 33 secured thereto and connected by means of a driving chain 34 to the reduction gear 5.

A tubular head 36 is eccentrically mounted in two bearings 37 which are rotatably housed in two bearing housings 38 secured to the support frame 1. A gear wheel 39 is eccentrically mounted on the head and is connected by means of gear wheels 40 to the reduction gear 5. An arm 41 is fixed on the head and is clamped between a locking ring 48 screwed to said head and the bearing 37 nearest the guide plates and has a stop 42 detachably fixed thereto by means of screws 43. The stop is rotatable with the head and bearings, and different size stops can be fitted so that the space between the front guide plate 24 and the stop can be varied to form washers of different thicknesses.

A spindle 44 is co-axially mounted in bearings 45 and 46 within the head 36 and has each end projecting outside said head. One end extends into the recess 26 of the front guide plate 24 and has a circular knife 47 mounted thereon which has only a slight clearance from the outer face of the front guide plate. The diameter of the knife is such that in operation it successively covers the guide holes 25 in the front guide plate 24. A pulley 49 is fitted to the other end of the spindle 44 and is driven by a belt 50 connected to a pulley 51 on the shaft of a motor 52. The belt also passes round a spring mounted jockey pulley 53 to compensate for the eccentric motion of the spindle 44 due to the eccentrically mounted head.

A chute 54 is provided beneath the knife for the delivery of washers cut from the tubing.

The head 36, cam 31 and rollers 2 are all driven at a speed of approximately 10 revolutions per minute. The circular knife is adapted to rotate at comparatively high speeds depending on the type of the material to be cut, and may range from 1200 revolutions per minute for cutting rubber having a Shore hardness of 80 to 3000 revolutions per minute for a softer material.

As the spindle 44 carrying the circular knife is mounted coaxially within the tubular head 36 and said head is eccentrically mounted in its bearings 37 the knife shaft revolves at a high speed, e. g. 3000 revolutions per minute, about its own axis and said axis revolves at 10 revolutions per minute about the axis of the bearings 37 which are co-axial with the guide plates, thus presenting the cutting edge of the knife to each of the rubber tubes in succession.

The apparatus operates as follows. The ends of the twenty long rubber tubes are fed through the grooves 8 of the rollers, through the holes 10 in the feed plate and through corresponding holes in the back guide plate, the slides, and the front guide plate. The motors operating the apparatus are then started. The rotating rollers urge the rubber tubing through the feed plate into the guide member, but the ends of all the tubes but one are held by the slides 19 which, as previously explained, have the holes 23 for the tubing offset from the holes of both back and front guide plates, thus nipping the tubes adjacent their ends, and preventing them from moving. Since the tubes are held immovable at one end, the revolving rollers merely skid over the surface of the rubber.

As the cam 31 revolves in its chamber between the front and back guide plates it operates one slide after another, forcing each slide radially outwards and thus temporarily aligning the hole in the slide with corresponding holes in the front and back guide plates. With the holes thus aligned the associated rubber tube, urged by the revolving rollers, moves through the guide plates until the end of the tube abuts the stop 42 which is mounted on the revolving head 36. As previously explained, the head is revolving at the same speed as the cam, and the timing is so arranged that as the cam operates a slide and allows a tube to pass through the guide plates, so the stop is placed ready to take the end of the tube and space it to the correct length for cutting. When this action, which takes only a fraction of a second, is completed, and the cam has moved out of engagement with the slide, the spring 22 associated with the slide forces said slide radially inwards, thus again trapping the rubber tube, but this time with its end projecting from the front guide plate 24 a distance determined by the stop. The end of the rubber tube is then cut off by the revolving knife, which follows the stop round, and forms a washer which falls into the chute 54 for delivery into a suitable receptacle.

It is to be understood that the above action is fully automatic and is continuous for as long as the tubing is passing through the rollers. With twenty tubes passing through the machine and the head carrying the knife making 10 revs. per minute, it follows that some 200 washers will be produced in the minute.

The rubber or other resilient material should not be too soft, or it will be liable to kink and bend between the rollers and the feed plate, or the feed plate and the back guide plate, or even between the front guide plate and the stop. On this latter account only comparatively short lengths can be cut from this machine, or such lengths that will not bend under their own weight combined with the end thrust applied by the rollers. It has been found that a Shore hardness of between 60 and 90 is desirable, the maximum length of the piece which can be cut depending mainly on its hardness and diameter.

Whilst the apparatus described above has been designed to cut thin washers from rubber tubing, it is understood that the invention is not limited to this embodiment. Any resilient material of uniform cross-section and up to about 2 inches thickness at its major axis, may be cut on a similar machine. With larger diameter sections or tougher compositions a circular saw blade may advantageously be used in place of the circular knife.

Having described our invention, what we claim is:

1. Apparatus for cutting unrestricted lengths of tubular or rod-like material transversely into portions of predetermined length comprising a stationary guide member having a plurality of passages for guiding said lengths, rotatable rollers for advancing the lengths through the passages, a cutting member movable to traverse each of the guide passages in turn, an abutment positioned to traverse each of said passages in turn in advance of said cutting member to stop the advance of each length in turn when said length projects a predetermined distance beyond said passage, a slide associated with each passage and spring loaded to trap the length of material in said passage, and cam means for releasing the length in each passage from the associated slide between successive movements of the cutting member across said passage.

2. Apparatus for transversely cutting lengths of material into sections of predetermined length which comprises a stationary guide member having passages spaced circumferentially about a central area and extending transversely of, and terminating in, a common cutting plane, rotatable rollers frictionally engaging said lengths of material to advance them through their respective passages and past said cutting plane, a knife moving in said cutting plane across each of said passages in turn, and an abutment spaced a predetermined distance from said cutting plane and movable to traverse each passage in turn in advance of said knife, a releasable catch for each passage movable transversely in its respective passage to engage a length of material therein, and a common drive rotating said abutment and said knife in spaced succession past successive passages and to release said catch in successive passages when said abutment is transverse of each respective passage.

3. The apparatus of claim 2 in which said knife comprises a rotatable disc knife and a supporting eccentric.

4. The apparatus of claim 2 in which said catch for each passage comprises a spring loaded slide in radial arrangement in said guide member.

5. The apparatus of claim 2 in which said catch for each passage comprises a spring loaded slide, said slides being arranged radially about a center and in which said apparatus comprises a cam having an axis of rotation passing through said center and engaging said slides.

6. Apparatus for cutting lengths of material into sections of predetermined lengths which comprises a stationary guide member having passages arranged in parallel and spaced in a closed series for guiding said lengths, rotatable rollers for advancing the lengths through the passages, a cutting member to traverse each of the guide passages in turn, an abutment positioned to stop the advance of each length in turn when said length projects a predetermined distance beyond its respective passage, said abutment being rotatable to traverse each of the guide passages in turn in advance of the cutting member, a slide associated with each passage and spring loaded to trap the length of material in said passage, and cam means for releasing the length in each passage from the associated slide between successive movements of the cutting member across said passage.

7. The apparatus of claim 6 in which the axes of the guide passages are on a common pitch circle.

8. The apparatus of claim 7 in which said cutting member comprises a rotatable disc having an axis spaced from the axis of a common pitch circle of the passages and rotatably mounted to rotate in a circular path about the axis of a pitch circle to traverse each of said passages in turn.

9. The apparatus of claim 6 in which said rollers comprise pairs of parallel rollers having complementary grooves to receive said lengths of material and means for driving said rollers.

10. The apparatus of claim 6 in which the axes of the passages are on a common pitch circle and the cutting member is a rotatable disc, the axis of which is spaced apart from the axis of the common pitch circle and is rotatable in a circular path about the axis of the pitch circle to traverse each guide passage in turn, the slide associated with each guide passage is located radially relative to said pitch circle and a cam to move the slides radially outwardly, said cam having an axis of rotation passing through the center of said pitch circle and making one revolution synchronously with the complete traverse by said cutting member of all of said passages, and in which said rotatable rollers comprise pairs of rotatable rollers having complementary grooves to receive the said length of material and in which the abutment is a spacing stop rotatable about the axis of the pitch circle of the passages in advance of the cutting member.

JAMES DOUGLAS SUMNER.
   GEORGE HENRY GOULDING.
   RONALD ERNEST GOLDING.

REFERENCES CITED

The following references are of record in the file of this patent:

UNITED STATES PATENTS

| Number | Name | Date |
|---|---|---|
| 691,432 | Anderson | Jan. 21, 1902 |
| 977,669 | McIntosh | Dec. 6, 1910 |
| 1,059,268 | Bond | Apr. 15, 1913 |
| 1,186,203 | Jeffery | June 6, 1916 |
| 1,528,446 | Martin | Mar. 3, 1925 |
| 1,533,126 | Martin | Apr. 14, 1925 |
| 2,022,799 | Blosser | Dec. 3, 1935 |
| 2,328,712 | Domke | Sept. 7, 1943 |

FOREIGN PATENTS

| Number | Country | Date |
|---|---|---|
| 117,604 | Australia | Oct. 7, 1943 |
| 464,804 | Germany | Aug. 27, 1928 |